United States Patent [19]
Kamra

[11] 3,972,276
[45] Aug. 3, 1976

[54] COOKING APPLIANCE
[76] Inventor: Girish Mohan Kamra, No. B-15, 8735, 165th St., Edmonton, Alberta, Canada, T5R 2R6
[22] Filed: Apr. 26, 1973
[21] Appl. No.: 354,874

[52] U.S. Cl.............................. 99/443 R; 99/340; 126/25 A
[51] Int. Cl.²......................................... A47J 37/07
[58] Field of Search.................. 9/353, 238.5, 238.8, 9/238.9, 339–340, 345–346, 349, 352, 423, 443 R; 222/510; 425/364–365, 366–367; 126/25

[56] References Cited
UNITED STATES PATENTS

| | | | |
|---|---|---|---|
| 1,220,929 | 3/1917 | Baltzley | 222/510 |
| 1,312,833 | 8/1919 | Colias | 99/345 |
| 1,509,455 | 9/1924 | Valenta | 99/353 X |
| 1,519,569 | 12/1924 | Vicars | 425/367 |
| 1,847,752 | 3/1932 | Coleman | 99/423 |
| 2,127,658 | 8/1938 | Walterspiel | 99/345 |
| 2,438,699 | 3/1948 | Groetchen | 99/423 |
| 2,495,865 | 1/1950 | Perkins | 99/423 X |
| 2,619,048 | 11/1952 | Fox | 425/367 X |
| 2,848,592 | 8/1958 | Mergen | 99/592 UX |
| 3,340,790 | 9/1967 | Simjian | 99/352 |
| 3,456,578 | 7/1969 | Pinsly | 99/339 |

Primary Examiner—Stanley N. Gilreath
Assistant Examiner—Arthur O. Henderson

[57] ABSTRACT

A cooking appliance of a chamber with a horizontal rotatable support disposed therein. A first heating element is provided above said support and one side of a shaft on which said support is mounted, and a second heating element disposed below said support and on the opposite side of the shaft. A fluid releasing device is provided with said chamber.

5 Claims, 3 Drawing Figures

COOKING APPLIANCE

PRIOR ART

British Patent No. 1,128,674 discloses a cooking appliance consisting of a fixed heating element disposed in the upper portion of the compartment and a second heating element having an upward pivotal movement from the horizontal grilling position to a vertical rotisserie cooking position and vice versa.

Further, British Patent No. 1,023,821 discloses a cooking appliance consisting similarly of a chamber and having a spit bar rotatably disposed therein. A heating element is provided with the ceiling of the chamber and wherein said ceiling can be raised from an initial position on the main part of the cooking chamber to leave a gap between it and at least part of the sides of the main part. Additional heating elements may also be provided on the seduvalla and base of said chamber.

A cooking appliance is also disclosed in British Patent No. 1,054,996 and which can be used for baking, grilling and toasting purposes. The appliance consists of a casing having an opening at the front thereof and a horizontal rotatable grid for supporting the food articles and such that the grid extends beyond the open end. A heating element is provided within the casing and above and below of the grid and such as to cover that part of the grid lying within the casing.

DESCRIPTION OF THE INVENTION

According to this invention there is provided a cooking appliance comprising a chamber, a horizontal rotatable support disposed within said chamber and mounted on a shaft and at least a first heating means provided above said support means and disposed on one side of said shaft and a second heating means provided below said support means, and disposed on the opposite side of said shaft such that a food article or articles disposed on said support means receives heat from above and below said support means upon rotation of said shaft.

In accordance with this invention, the first and second heating means are provided on opposite sides of the said shaft and such that their distances from the support means can be adjusted. If desired, one of the heating means may be stationary whereas the height of the other heating means can be adjusted.

Further, in accordance with this invention there is provided a shaping means for shaping a food preparation from a dough and which consists of an input and output roller, at least a pair of secondary rollers provided adjacent said input and output rollers.

Further objects and advantages of this invention will be apparent from the ensuing description when read in conjunction with the accompanying drawings wherein.

Figure 1:
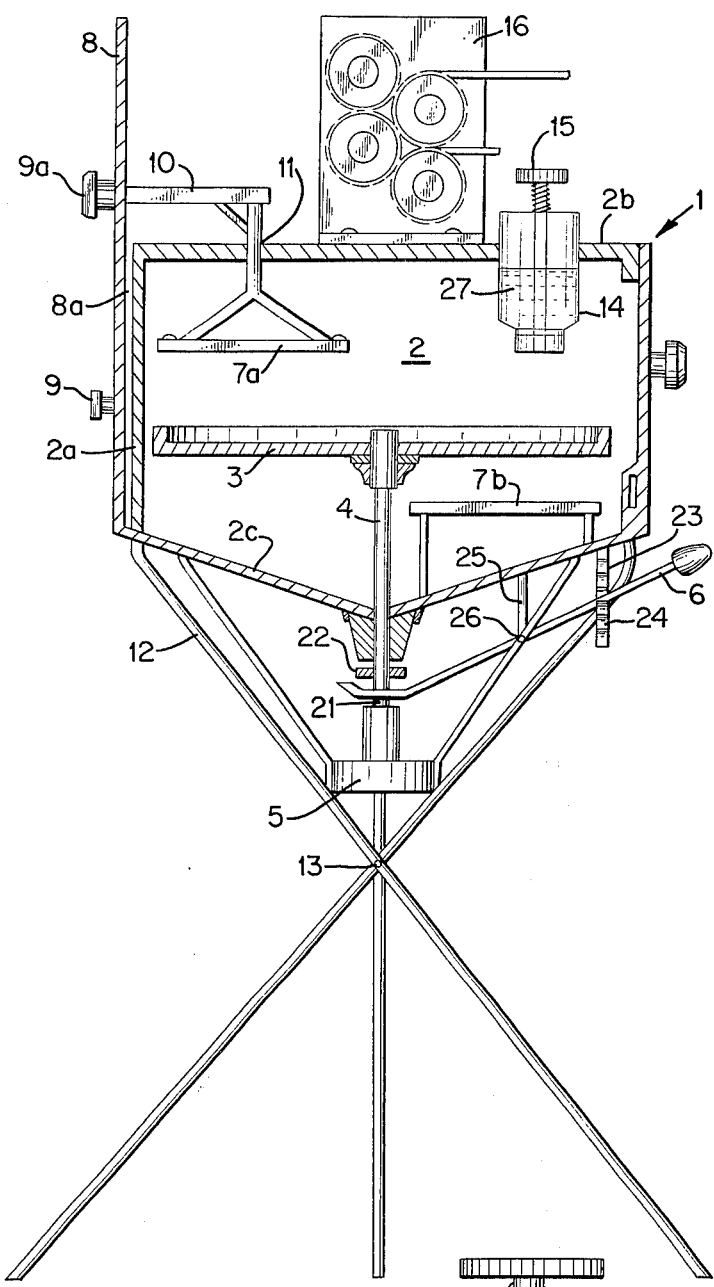
FIG. 1 shows the cooking apparatus in accordance with the teachings of this invention.

Referring to the drawings and in particular to FIG. 1, the cooking apparatus 1 of this invention consists of a chamber 2 having side walls 2a and a cover member 2b and base 2c. The chamber 2 is made suitably of a double walled sheet metal and has a lining (not shown) of an insulating material, such as asbestos or glass wool. The chamber 2 is also provided with a door facilitating an introduction and removal of a food preparation.

A rotatable support 3 mounted on a shaft 4 is provided within said chamber. The shaft 4 is mechanically coupled to a motor 5 by any suitable coupling means. In order to effect a disengagement of the shaft 4 with the motor 5, a lever 6 is provided which for purposes of disengagement raises the shaft 4 until a disengagement with said motor 5 is effected. For this purpose the lever 6 has an opening 21 for receiving the shaft 4 and allowing thereby a coupling of the shaft 4 with the motor 5. A collar 22 is provided on the shaft 4 and above the opening 21 and such that the lever 6, upon lowering, bears against the collar 22 and thereby allows a decoupling and raising of the shaft 4. In order to keep the shaft 4 in a raised position to facilitate a loading of the food article to be prepared on the support 3, a strip 23 depends from the base 2c. The strip 23 is provided with a plurality of teeth 24 such that the lever 6 is adapted to rest in any one of the teeth. Further, the lever 6 is pivotally held to another strip 25 depending from said base 2c by means of a pin 26.

A heating source is provided within said chamber 2. By way of example only, the said heating source consists of a pair of heating elements 7a and 7b. One of the concepts of this invention resides in the manner of providing the heating elements such that the element 7a is disposed above the support 3 and on one side of the shaft 4 whereas the element 7b is disposed below the support 3 and on the opposite side of the shaft 4. The heating elements 7a and 7b are adapted to be connected to a power source (not shown). Further, the height of the element 7a from the support 3 is capable of being adjusted. For this purpose, the heating element 7a is held to the chamber 2 by means of a plate 8, said wall 2a having a plurality of holes 8a. The plate 8 is held to the chamber 2 by means of a bolt 9 whereas the heating element 7a is held to a rod 10, said rod 10 being held to the plate 8 by means of a bolt 9a. An opening 11 is provided on the top wall member 2b of the chamber 2 for introduction of the rod 10. Though the drawings illustrate means by which only the height of the heating element 7a from the support 3 can be adjusted, it will be apparent that similar means can also be provided for the heating element 7b to adjust its position in relation to support 3.

The incorporation of a rotatable support means 3 and the manner of providing the heating elements 7a and 7b forms an important concept of this invention. It will be apparent that if a food preparation which is to be prepared is placed on the support means 3 which is thereafter rotated, the food preparation would receive heat from above and below said support means 3. This thus avoids the disadvantage of constantly raking the food preparation manually during the process of cooking which is a disadvantage associated with the present cooking appliances. Another distinct advantage of the cooking appliance of this invention is that several food preparations can be placed on the support means 3 and thus prepared simultaneously.

The chamber 2, if required, can be supported on adjustable tripod 12 pivotally held together by a pin 13. Thus, the height of the chamber 2 with respect to a reference, such as a floor, can also be adjusted.

Figure 3:
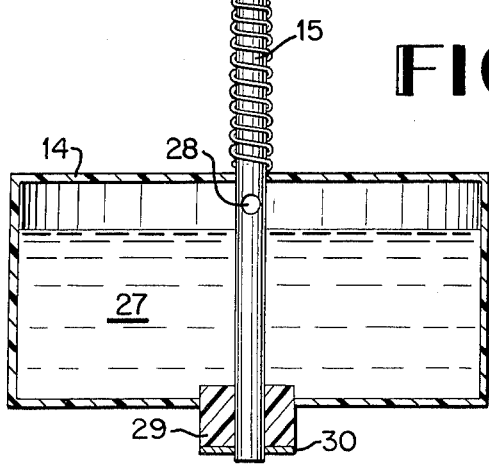
FIG. 3 shows an apparatus containing a liquid.

Referring to FIG. 3, by the wall 2b of the chamber is supported a container 14, which projects within chamber 2. The container 14 is adapted to hold, for example, an edible oil 27 for the purpose of spraying on to a food article resting on the support 3. The container has a spring loaded plunger 15 having a hole 28, which in the inoperative position, lies above the surface of oil 27. A plug 29, having a central opening through which the plunger 15 travels, is fitted in the base of container 14 to allow passage for the oil when the plunger is depressed. A washer 30 is provided on said plunger 15 to bear against plug 29, when in an inoperative position. This forms the fluid releasing device.

In accordance with another embodiment of this invention, a second container similar to that of container 14 may be fitted on said wall 2b for holding material such as mix for pancakes.

Figure 2:
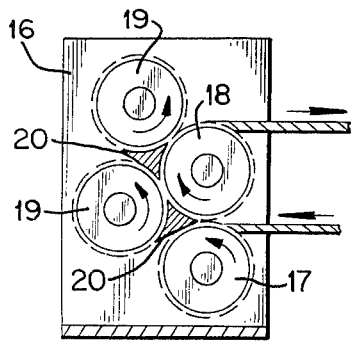
FIG. 2 shows a shaping apparatus.

Reference is now made to FIG. 2 which shows the shaping apparatus 16 of this invention. The shaping apparatus 16, as shown in FIG. 1, is mounted on the chamber 2. The shaping apparatus 16, which may be used for providing a shape from dough, consists of an input roller 17 and an output roller 18 and a pair of secondary rollers 19. The direction of rotation of the rollers is shown in FIG. 2. A pair of guides 20 are provided which assists in guiding the shaped dough through the said apparatus.

I claim:

1. A cooking appliance comprising an enclosed cooking chamber, a vertical shaft rotatable within said chamber, a horizontal rotatable food support means disposed within said cooking chamber and mounted on said shaft, means for rotating said shaft and said food support means, a first heating means spaced above said food support means and a second heating means spaced below said food support means thus providing a pair of non-axial and non-overlapping heating elements geometrically disposed on opposite sides of the shaft such that food articles disposed on said food support means alternately receive heat from above and below as said food support means is rotated past said heating elements.

2. An apparatus as claimed in claim 1 wherein the first and second heating means is provided such that their distance from the support means can be varied.

3. An apparatus as claimed in claim 1 wherein said shaft is adapted to be coupled to a motor by known coupling means, said coupling or uncoupling being effected by means of a lever.

4. An apparatus as claimed in claim 1 including a fluid releasing device and comprising a chamber adapted to hold a fluid, such as edible oil therein, a spring loaded plunger in said chamber, said plunger having an opening which in an inoperative position of the plunger remains above the surface of said fluid, a plug fitted in the base of said chamber and having an opening for the travel of said plunger, a washer adapted to bear against said plug in a plunger inoperative position so that upon a downward movement of said plunger the fluid contained within the chamber is released.

5. An apparatus as claimed in claim 4 wherein a second fluid releasing device is provided with said main chamber, said second device being adapted to hold a fluid such as pancake mixture.

* * * * *